United States Patent [19]

Stewart et al.

[11] 3,927,266

[45] Dec. 16, 1975

[54] RINGER POWER GENERATOR CIRCUIT FOR SUBSCRIBER CARRIER STATION TERMINAL

[75] Inventors: James A. Stewart, Menlo Park; Neale A. Zellmer, Belmont, both of Calif.

[73] Assignee: GTE Automatic Electric Laboratories Incorporated, Northlake, Ill.

[22] Filed: Jan. 16, 1974

[21] Appl. No.: 433,984

[52] U.S. Cl. ........... 179/2.5 R; 179/84 R; 179/17 E

[51] Int. Cl.[2] ............................................ H04J 1/14

[58] Field of Search ......... 179/2.5 R, 84 SS, 84 TR, 179/84 VF, 84 A, 84 R, 17 E, 87

[56] References Cited

UNITED STATES PATENTS

| | | | |
|---|---|---|---|
| 3,012,102 | 12/1961 | Hodges | 179/86 |
| 3,601,538 | 8/1971 | May et al. | 179/2.5 R |
| 3,628,066 | 12/1971 | Surprenant | 307/271 |
| 3,681,621 | 8/1972 | Downs | 307/271 |

*Primary Examiner*—Kathleen H. Claffy

*Assistant Examiner*—C. T. Bartz

*Attorney, Agent, or Firm*—Russell A. Cannon; Leonard R. Cool

[57] ABSTRACT

In a subscriber carrier station terminal including a two-wire drop that is associated with a VF hybrid circuit and a handset thereof, a DC ringer voltage is generated by a DC-DC converter that is powered only during a ringing cycle. Power to drive the ringer in the handset is coupled to the two-wire drop through a pair of back-to-back (decoupling) diodes that are connected to the neutral terminal of the converter and relay contacts that are switched at the central office ringing frequency between +80 volt and −80 volt DC output lines of the converter. The VF hybrid is decoupled from the two-wire drop by a third diode during ringing. The converter is decoupled from the drop circuit by the back-to-back diodes when voice signals are on the drop lines. Positive ring trip is provided during a ringing cycle by sensing the current transient produced in the drop when the associated subscriber carrier handset goes off hook in order to turn off the converter for a prescribed time interval to enable establishment of loop current and completion of ring trip.

30 Claims, 5 Drawing Figures

RINGER POWER GENERATOR CIRCUIT FOR SUBSCRIBER CARRIER STATION TERMINAL

BACKGROUND OF THE INVENTION

This invention relates to subscriber carrier equipment for telephone communications such as is described in the article, "A Single Channel Station Carrier System for Permanent Service Applications" by James A. Stewart, International Conference on Communications, June 11–13, 1973, ICC '73 Conference Record, vol. 1, pages 4–6 to 4–10. More particularly, this invention relates to ringer power generator circuitry in the station terminal of such subscriber carrier equipment.

Current techniques of constructing residential and commercial buildings include many labor-saving practices. One such practice is to pre-wire each building with telephone lines, e.g., one or two pairs of wires, in the walls thereof. By way of example, a single pair of wires may be continuously looped throughout the walls of a building. Alternatively, two pairs of wires sharing a common sheath may be laid out in walls of the building. A telephone subscriber handset, which typically requires at least one pair of wires to operate, is then connected to these wires wherever and whenever the need arises. In view of the rapidly expanding demand for multiple private line subscriber telephone circuits in a home or the same area of a commerical building, it is desirable that each pre-wired cable pair be available for use with at least one private line subscriber handset. Subscriber carrier telephone systems are employed to provide multiple subscriber channels, e.g., one subscriber carrier channel and one physical subscriber channel as is described in the ICC '73 article, supra, over a single cable pair. The subscriber carrier terminal of one prior-art subscriber carrier telephone system includes a ringer circuit that makes it necessary to connect three drop wires to a single associated subscriber handset. Such a ringer circuit requires that the associated subscriber channel employ both of the pre-wired cable pairs to provide only a single operational private line handset. Also, since the third wire that is needed for ringing the handset is added to the telephone system in the subscriber carrier terminal, the system is no longer balanced. If the two pairs of wires that are required for this one subscriber carrier handset are located in the same sheath as the pair of drop wires that are connected to the handset of an associated physical subscriber channel, which is normally the case in residential applications, crosstalk may occur between the wires of the physical subscriber and carrier subscriber drops. Such a condition is undesirable.

An object of this invention is the provision of an improved ringer power generator circuit requiring only a single pair of drop wires for connecting a subscriber carrier station terminal to an associated handset.

BRIEF DESCRIPTION OF DRAWINGS

This invention will be more fully understood from the following detailed description of a preferred embodiment thereof together with the drawings in which.

DESCRIPTION OF PREFERRED EMBODIMENT

The description of the subscriber carrier telephone system in the ICC '73 article (supra) is incorporated herein by reference. This article also appears in the IEEE Transactions of the Communication Society, March 1974, vol. com-22, no. 3, pages 312 to 319; and under a different title in the GTE Automatic Electric Technical Journal, July 1974, vol. 14, no. 3, pages 135 to 142. This carrier system is generally illustrated by the block diagrams in FIGS. 1 and 2.

Figure 1:
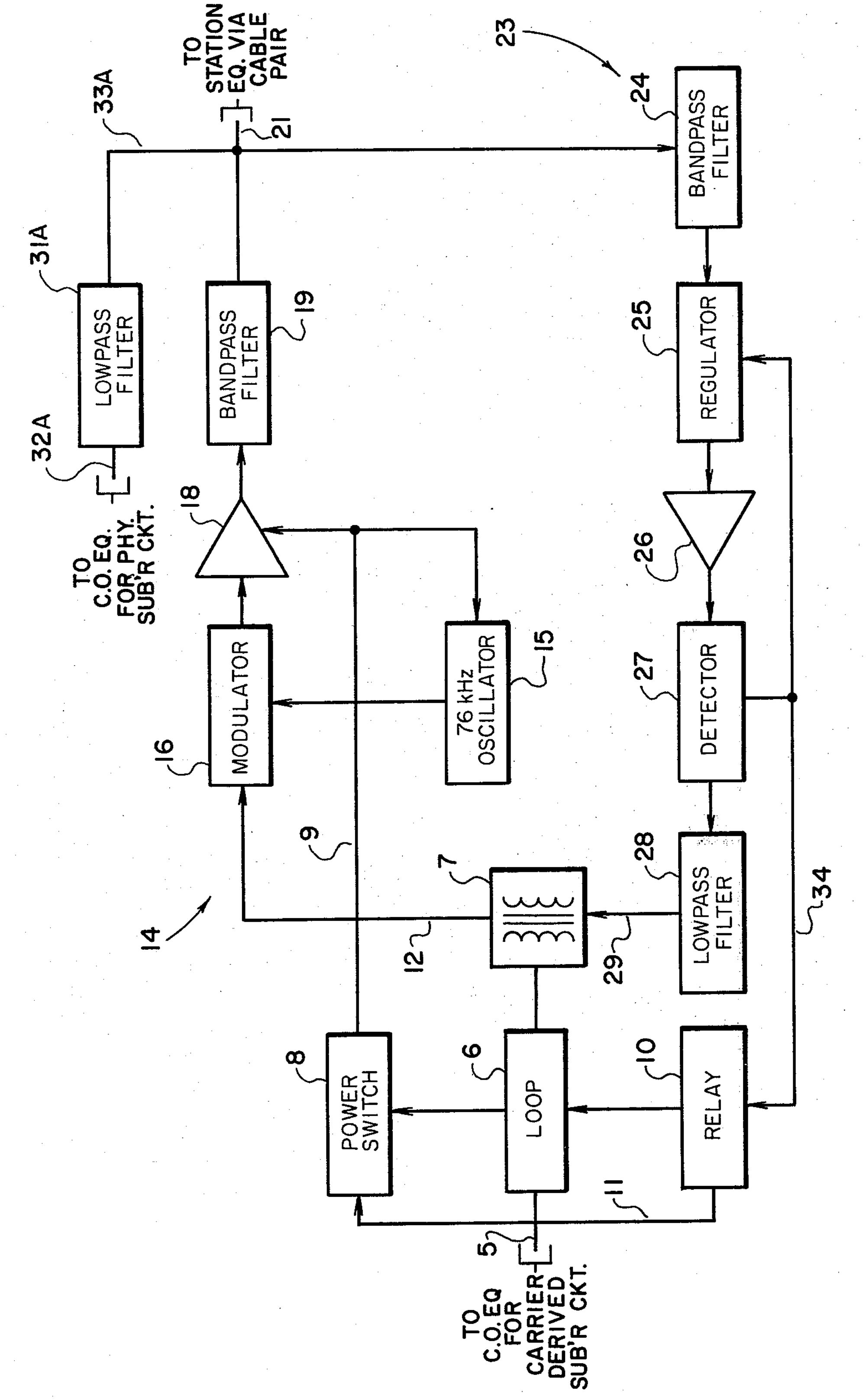
FIG. 1 is a block diagram of the central office terminal of a single channel station carrier system.

Referring now to FIG. 1, a central office subscriber carrier terminal typically comprises a subscriber loop 6 that is connected on lines 5 to central office equipment for the carrier derived subscriber circuit; a voice frequency (VF) hybrid circuit 7, power switch 8, and relay 10 that are associated with loop 6; a transmitter section 14 including a 76 kHz oscillator 15, and a modulator 16, power amplifier 18, and 72 – 80 kHz bandpass filter 19 which are connected in series between the output line 12 of hybrid 7 and the line 21 which is connected to a cable pair; and a receiver section 23 including a 24 – 32 kHz bandpass filter 24, regulator 25, power amplifier 26, detector 27, and VF lowpass filter 28 which are connected in series between the cable pair (line 21) and the input line 29 to hybrid 7. The physical subscriber circuit of the central office terminal comprises a VF lowpass filter 31A that is connected through line 32A to central office equipment and on line 33A to the cable pair. Similarly, the station terminal at the subscriber facility in FIG. 2 comprises a VF hybrid circuit 37, power switch 38, and ringer power generator circuit 40 which are associated with a loop circuit 36; a receiver section 53 including a 72 – 80 kHz bandpass filter 54, regulator 55, power amplifier 56, detector 57, and VF lowpass filter 58 which are connected in series between the cable pair (line 51) and the input line 59 to the VF hybrid 37; and a transmitter section 44 including a 28 kHz oscillator 45, and a modulator 46, regulator 47, power amplifier 48, and 24 – 32 kHz bandpass filter 49 that are connected in series between the output line 42 of hybrid 37 and the line 51 which is connected to the cable pair. The physical subscriber circuit of the subscriber station terminal comprises a VF lowpass filter 31B that is connected through line 32B to the associated handset and on line 33B to the cable pair. An output of detector 57 is applied on line 64 to the ringer generator 40. In accordance with this invention, the drop circuit to the carrier channel handset includes only two lines, i.e., the line 35A from loop 36 and the line 35B which is actually connected to loop 36 through the ringer generator circuit 40. In a prior-art system, the carrier channel drop circuit included a pair of wires from a loop 36 and a third wire from a ringer power generator circuit.

Figure 2:
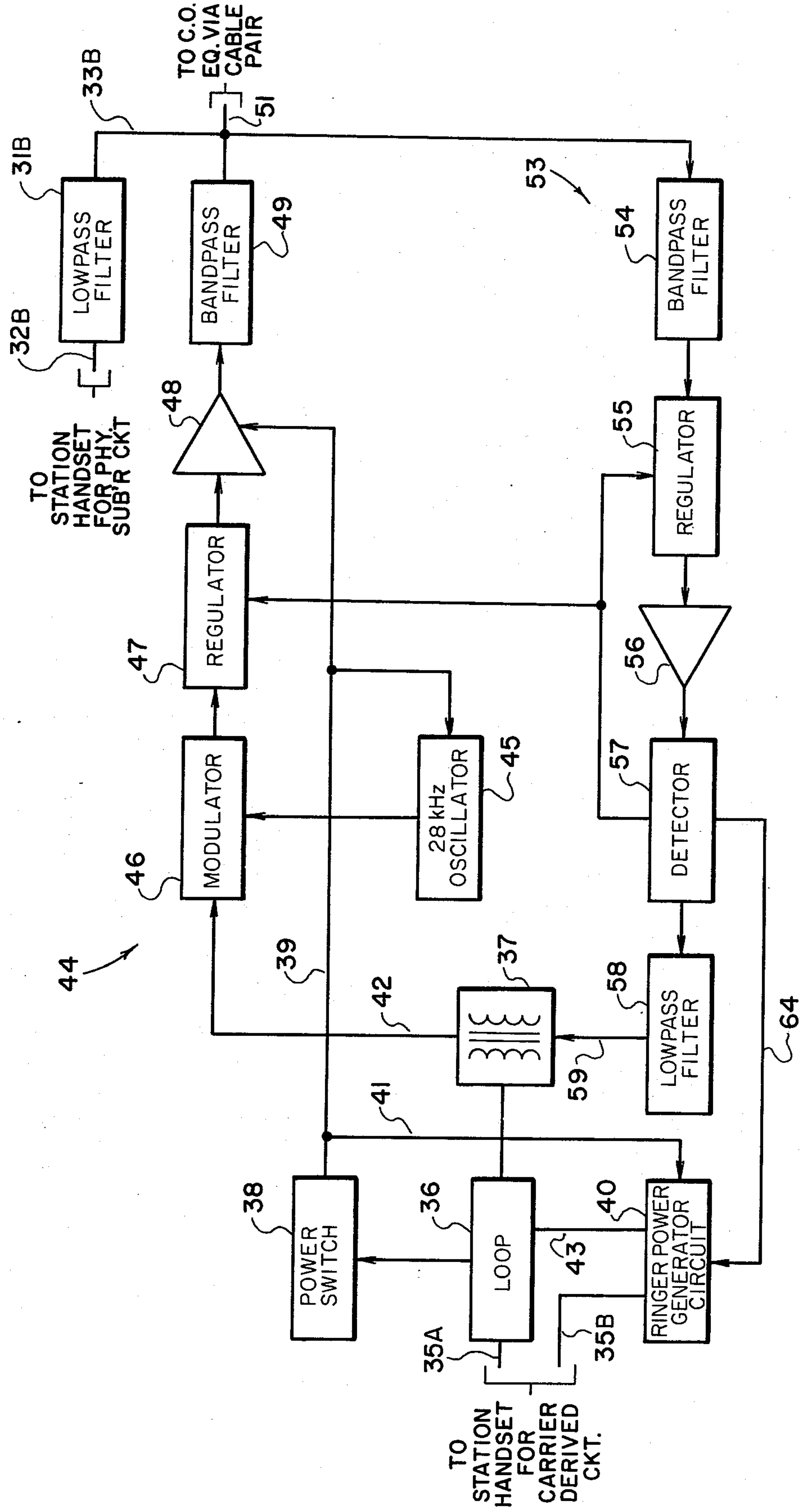
FIG. 2 is a block diagram of the subscriber station terminal of a single channel station carrier system.

Briefly, the system in FIGS. 1 and 2 adds a single carrier channel to a cable pair without displacing the physical channel. The system transmits pulsed carrier from a central office subscriber carrier terminal during ringing of the associated subscriber handset, and transmits steady carrier from a carrier subscriber station terminal for indicating that the carrier subscriber's handset is off hook. The mechanism for transmitting voice signals on the physical and carrier channels between the central office and subscriber terminals is known in the art.

The operation of the system in FIGS. 1 and 2 will now be described in more detail. The lowpass filters 31A and 31B in FIGS. 1 and 2, respectively, pass VF signals in the physical channel on the associated lines 32A, 33A and 32B, 33B. These filters 31A and 31B block 28 kHz and 76 kHz carrier signals, however, on the lines 21 and 51, respectively. The power switch 38 in FIG. 2 causes oscillator 45 to transmit a 28 kHz carrier signal to the central office terminal in FIG. 1 only when the carrier channel handset is off hook and current is flowing in loop 36.

The switch 8 in FIG. 1 applies power to the 76 kHz carrier oscillator 15 when a continuous 28 kHz carrier signal is received on line 21 from the station terminal, and when a central office ringing signal is received on line 5. The continuous 28 kHz carrier signal received on line 21 is detected by circuit 27 which produces a signal on line 34 that energizes relay 10 to cause switch 8 to keep the central office carrier generator 15 continuously energized during the time interval that the carrier channel handset is off hook. When the carrier channel handset is on hook, a central office ringing signal on line 5 in FIG. 1 pulses switch 8, and thus the 76 kHz carrier oscillator 15 on and off at a 20 Hz ringing frequency. A typical ringing signal on line 21 is therefore alternately a 2-second ringing period made up of bursts of 76 kHz carrier signal occuring at a 20 Hz rate, and a 4-second silent period during which 76 kHz is absent, the ringing and silent periods of a ringing cycle being set by an interrupter circuit in the central office. The pulses of 76 kHz carrier signal received on line 51 are detected by circuit 57 in FIG. 2 which produces low voltage DC pulses on line 64 that cause the ringer power generator circuit 40 to energize a bridged ringer in the carrier channel handset to produce a high voltage ringer voltage on line 35B. The circuit 40 converts the low voltage - low power (approximately 1 volt and 2 milliwatts) ringing signal on line 64 to a higher voltage - higher power (approximately 80 volts and 1 watt) ringer voltages on line 35B for driving a ringer in a subscriber handset. When this carrier channel handset goes off hook and current flows in loop 36, switch 38 is activated to energize the carrier oscillator 45 which produces a 28 kHz carrier signal that is detected by circuit 27 in the central office terminal. The detector output signal on line 34 causes relay 10 to initiate ring trip in the central office. This operation of relay 10 also maintains switch 8 closed to keep the central office carrier oscillator 15 continuously energized. The mechanism for transmitting voice signals on the physical and carrier channels between the central office and subscriber terminals is known in the art.

Figure 3:
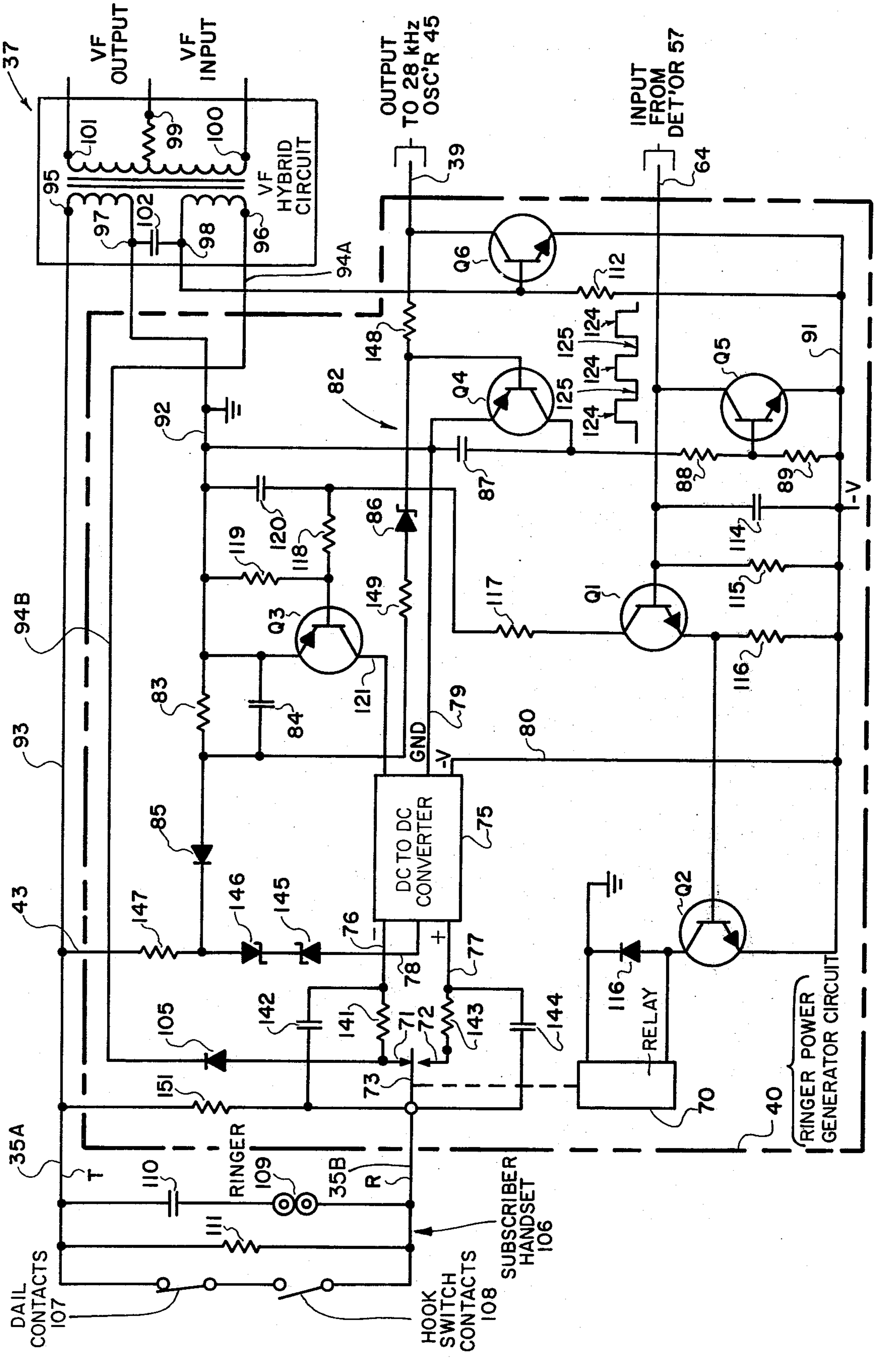
FIG. 3 is a circuit and block diagram of a ringer power generator circuit embodying this invention and useful in the system illustrated in FIGS. 1 and 2.

A ringer power generator circuit 40 embodying this invention is illustrated in schematic form in FIG. 3. The ringer circuit 40 comprises a control transistor Q1; relay 70 and relay driver transistor Q2; a DC-DC converter 75 and associated power switch transistor Q3; and a transient ring trip circuit 82 including resistor 83 and capacitor 84, diodes 85 and 86, control transistor Q4; capacitor 87, resistors 88 and 89; and ring disable transistor Q5. The line 91 at the bottom of FIG. 3 is connected to a negative supply voltage −V such as −6 volts. The line 92 near the top of FIG. 3 is connected to ground.

Figure 5:
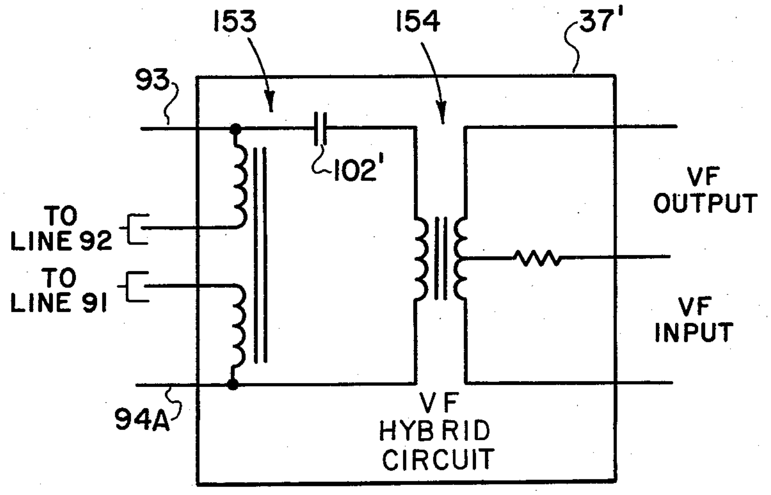
FIG. 5 is a schematic diagram of an alternate embodiment of the hybrid circuit in FIG. 3.

A ringing signal from a central office subscriber carrier terminal in FIG. 1 is detected by circuit 57 in the subscriber carrier station terminal in FIG. 2 and is applied on line 64 to ringer generator circuit 40 in FIG. 3. The loop 36 in FIG. 2 comprises the lines 93 and 94A in FIG. 3. The one ends of lines 93 and 94A are connected to terminals 95 and 96, respectively, on the drop side of the VF hybrid 37 which is shown in schematic form in FIG. 3. An alternate hybrid circuit 37' and method of connecting a DC voltage to the drop lines is shown in FIG. 5. This hybrid 37' in FIG. 5 includes a balanced choke 153 that is wound on a core that is separate from the core of the transformer windings at 154. A VF input signal from the central office is applied to the terminals 99 and 100 of the hybrid 37 in FIG. 3. A VF output signal to the central office is coupled from hybrid terminals 99 and 101. The capacitor 102 between terminals 97 and 98 on the drop side of the hybrid is an effective short circuit to VF signals and an open circuit to a DC signal, i.e., loop current. Line 94A is also connected through line 94B, diode 105, and the relay contact 71 and arm 73 of the ringer generator circuit 40 to the ring line 35B of the VF drop. A carrier channel subscriber handset 106 is bridged across the tip line 35A and ring line 35B of the VF drop. The handset 106 is represented as comprising dial contacts 107, hook switch contacts 108 (which are shown for the on-hook condition of the handset), a straight line ringer 109 and associated capacitor 110, and resistor 111 which represents the ringer leakage resistance. Positive and negative DC output voltages of converter 75 on lines 76 and 77 are alternately applied to the ring line 35B through contacts 71 and 72 and arm 73 associated with relay 70. The tip side 35A of the drop is connected to terminal 95 on the drop side of the hybrid. The power switch 38 in FIG. 2 comprises the transistor Q6 in FIG. 3 which is connected to the loop line 94A through the hybrid terminals 98 and 96 Q6 is shown in FIG. 3 as an element of circuit 40 for convenience.

The VF signal circuit in FIG. 3 extends from hybrid terminal 96 through lines 94A and 94B, diode 105, relay contact 71 and arm 73, the handset 106, line 93, the windings on the drop side of the hybrid and capacitor 102 back to the hybrid terminal 96. The DC path for loop current to flow when the handset 106 is off hook and hook-switch contacts 108 are closed is from the loop supply voltage −V (line 91) through resistor 112, and the emitter-base diode of Q6, the hybrid winding between terminals 98 and 96, lines 94A and 94B, diode 105, relay contact 71 and arm 73, hook-switch contacts 108 of handset 106, line 93, and the hybrid winding between terminals 95 and 97 to the line 92 which is connected to ground.

Referring now primarily to the ringer generator circuit 40, all of the transistors Q1 – Q6 are cut off during quiescent operation when a ringing signal is absent from input line 64 and handset 106 is on hook as is shown in FIG. 3. The ringing signal on line 64 is a detected 76 kHz carrier signal that is pulsed on and off at a 50% duty cycle and a 20 Hz rate. This ringing signal on line 64 is therefore DC voltage pulses which occur in groups that are controlled by the interrupter circuit in the central office. This ringing signal is filtered by capacitor 114 and resistor 115 to provide a DC voltage on the base electrode of Q1 for controlling the operation thereof. The Q1 emitter electrode is connected to the Q2 base electrode for controlling the operation thereof and thus the operation of relay 70. A diode 116 is connected across relay 70 to protect Q2 by providing a path for current flowing in relay 70 when Q2 is switched off. The Q1 collector electrode is connected through the current limiting resistor 117 and bias resistor 118 to the Q3 base electrode for controlling the operation thereof. The Q3 base electrode is also connected through resistor 119, and through the resistor 118 and capacitor 120 to the ground line 92. The Q3 collector electrode is connected on line 121 to converter 75 for controlling the operation of the latter.

Each of the transistors Q1, Q2, and Q3 is caused to conduct when a positive input pulse 124 is received on line 64. The capacitor 120 is caused to charge toward the negative supply voltage –V during conduction of Q1. When Q1 is cut off at 125 between input pulses 124 on line 64, capacitor 120 discharges through the resistor 118 and the Q3 base-emitter junction diode to maintain Q3 conducting and thus the converter 75 operating for a prescribed time interval to deliver power on line 76 when relay 70 is de-energized. Resistor 119 ensures that capacitor 120 discharges to zero volts when handset 106 is on hook and Q3 is cut off for an extended period of time during which a ringing signal is absent from line 64 so that transient input signals do not cause tapping of the bell associated with ringer 109. The capacitance of capacitor 120 and the RC time constant of the resistors 118 and 119 and capacitor 120 are selected to be sufficiently large to keep transistor Q3 conducting for a time interval that is longer than the time interval 125 between pulses 124 on line 64. By way of example, capacitor 120 and resistor 118 and 119 may have values of 300 microfarads, 100 ohms and 1 kilohm, respectively.

Figure 4:
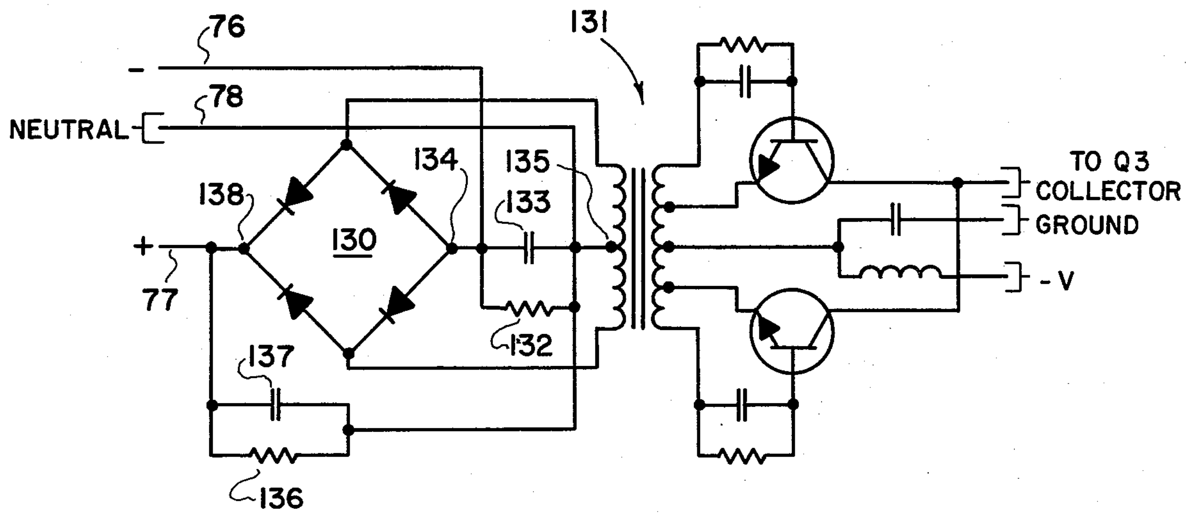
FIG. 4 is a circuit diagram of a DC-DC converter that may be employed in the embodiment of this invention illustrated in FIG. 3.

The converter 75 may, by way of example, comprise oscillator such as is illustrated in schematic form in FIG. 4. A bridge rectifier 130 is connected across the center-tapped winding of transformer 131. The shunt combination of a resistor 132 and capacitor 133 is connected between the terminal 134 of the rectifier and the center tap 135 to develop a constant negative DC voltage on line 76. A resistor 136 and capacitor 137 are connected between the opposing terminal 138 of rectifier 130 and the center tap 135 to produce a constant positive DC voltage on line 77. Resistors 132 and 136 are used to discharge the capacitors at the end of a ringing period so that the voice and dialing signal transmission is not impaired. By way of example, the oscillator may be a 15 kHz high frequency oscillator producing –80 volt DC and +80 volt DC signals between the associated lines 76 and 77, and the neutral terminal 78 thereof.

Again referring to FIG. 3, the negative converter output voltage on line 76 is connected through current-limiting resistor 141 to the contact 71 of relay 70, and through capacitor 142 to the movable arm 73 of the relay which is connected to the drop line 35B. Similarly, the positive converter output voltage on line 77 is connected through a current-limiting resistor 143 to the other contact 72 of relay 70, and through capacitor 144 to the movable arm 73 of the relay. Since the handset 106 presents an inductive load across the converter outputs, the capacitors 142 and 144 are connected between the relay arm 73 and the associated contacts 71 and 72 to prevent arcing when the arm 73 is switched between the contact points. Since the charge on capacitors 142 and 144 may be approximately 160 volts, resistors 141 and 143 are employed to limit current therethrough to prevent burning of the associated contacts.

The normally closed relay contact 71 and arm 73 are connected to the drop line 35B when the relay is not energized. This contact 71 is also connected through diode 105 and the loop line 94A to hybrid terminal 96. Since the negative supply voltage –V on the cathode of diode 105 is much less than the negative converter voltage on line 76 and the anode of the diode 105 during ringing, diode 105 is maintained nonconducting during ringing for decoupling the VF hybrid from the drop line 35B.

The neutral terminal 78 of converter 75 is coupled through back-to-back breakdown diodes 145 and 146 and resistor 147 to the loop line 93 which is connected to the tip side 35A of the handset. The diodes 145 and 146 may, by way of example, 2.4 volt Zener breakdown diodes which effectively decouple the converter 75 from the drop line 93 and 35A during VF transmission since a voice signal thereon seldom exceeds approximately 1.5 volts. These diodes 145 and 146 alternately conduct, however, during ringing to provide a return path for the ringer current from converter 75 when the arm 73 is alternately connected to relay contacts 71 and 72. The resistor 151 is effectively connected between drop lines 35A and 35B to provide a nominal load across the output of converter 75 when only a single handset 106 is connected to the drop.

The ring trip circuit 82 comprises the capacitor 87 and resistors 88 and 89 which are connected in series between the ground line 92 and the negative supply voltage –V on line 91; the transistor Q4 which has emitter and collector electrodes connected across capacitor 87; and Q5 which has emitter and collector electrodes connected to the negative supply voltage –V and input line 64, respectively. The capacitor 87 is charged to the negative supply voltage –V during quiescent operation. Capacitor 87 has a large value of capacitance so that a relatively long time interval is required to charge this capacitor after the charge thereon is dumped during conduction of Q4. The base electrode of Q4 is connected through resistor 148 to the Q6 collector electrode and through diode 86, resistor 149, diode 85 and resistor 147 to drop line 35A. The anode of diode 85 is also connected through the parallel combination of resistor 83 and capacitor 84 to the ground line 92. Diode 85 conducts in response to negative transient signals, such as occur when the handset 106 goes off hook during the active part of a ringing cycle, to allow storage thereof by capacitor 84. In this manner, capacitor 84 ensures the presence of such a transient signal voltage for a minimum prescribed time interval. Diode 86 is preferably a 12-volt Zener breakdown diode that conducts when the voltage developed on capacitor 84 exceeds approximately 13 volts.

The operation of ringer generator circuit 40 will now be discussed in detail. The ringing signal from the central office subscriber carrier terminal is, by way of example, a 76 kHz carrier signal from oscillator 15 which is pulsed on and off at a 20 Hz ringing rate. This 76 kHz signal is detected in the subscriber carrier station terminal to produce a 20 Hz pulsed DC signal on line 64. Although a pulsed oscillator 15 is employed here for developing a ringing signal on line 64, other mechanisms may be employed for accomplishing this function.

During quiescent operation when a ringing signal is absent from line 64 and handset 106 is on hook, the transistors Q1 – Q6 are cut off, and capacitor 87 is charged to the loop supply voltage −V in order to maintain Q4 and Q5 cut off. A pulse 124 of ringing signal on line 64 causes Q1 to conduct to drive Q2 into conduction to energize relay 70 and move the arm 73 thereof to the contact 72. Conduction of Q1 also drives Q3 into conduction to energize converter 75 and cause capacitor 120 to charge through Q1 towards the supply voltage −V. The positive converter voltage on line 77 is applied through relay contact 72, arm 73, and line 35B to energize the ringer 109 in handset 106. During the period of a pulse 124, ringing current flows from line 77 of converter 75 and through relay contact 72 and arm 73, the handset ringer 109, drop line 35A, resistor 147, and diodes 145 and 146 to the neutral terminal 78 of the converter. The voltage developed across resistor 147 by this ringing current is not sufficient to break down diodes 85 and 86. The VF path is open during the period of the pulses 124 due to the open circuit between the relay contact 71 and arm 73. During the time intervals at 125 between DC pulses 124 of ringing signal on line 64, Q1 is biased into cutoff. This causes Q2 to also be nonconducting so that relay 70 is de-energized to switch the arm 73 to the other contact 71 as is shown in FIG. 3. Q3 is maintained in conduction, however, for a time interval that is greater than that at 125 between the pulses 124 on line 64 by discharge of capacitor 120 through resistor 118 and the Q3 base-emitter junction diode. Thus, converter 75 remains operational during the period 125 between DC pulses 124 in order to produce a negative DC voltage on line 76 that is applied through the relay contact 71, arm 73, and drop line 35B to again cause the ringer 109 to ring the associated bell in handset 106. During this period at 125, ringing current flows from line 76 of the converter through the relay contact 71 and arm 73, drop line 35B, the handset ringer 109, drop line 35A, resistor 147, and diodes 145 and 146 to the neutral terminal 78 of the converter. Again, the voltage across resistor 147 that is produced by this ringing current therethrough is not sufficient and is of the wrong polarity to cause diodes 85 and 86 to conduct. The VF hybrid is decoupled from drop line 35B and thus handset 106 during this ringing interval 125 by diode 105 which is maintained nonconducting by the reverse voltage across it. This operation continues until the handset 106 goes off hook, or until the ringing signal from the central office is discontinued. It is desirable to initiate ring trip whether the handset 106 goes off hook during the ringing period of a ringing cycle (when converter 75 is activated) or during the silent period of the ringing cycle (when Q3 is cut off and converter 75 is not activated, i.e., + and − DC voltages are not present at the output terminals of the converter).

Consider now the latter case where the handset 106 is on hook and the DC pulses 124 are absent from line 64 during the silent period of a ringing cycle. During this time interval, the transistors Q1 – Q6 are all cut off and nonconducting. When handset 106 goes off hook to close the hook-switch contacts 108, loop current flows from the ground line 92 through hybrid terminals 97 and 95, loop line 93, the closed hook-switch contacts 108, relay arm 73 and contact 71, diode 105, loop line 94A, the hybrid terminals 96 and 98, and resistor 112 to the supply voltage −V. The bias voltage developed across resistor 112 drives Q6 into conduction to effectively connect the Q4 base electrode to −V and thus to cause Q4 to conduct through resistors 88 and 89. The voltage developed across resistor 89 biases Q5 into conduction to effectively connect the Q1 base electrode to the supply potential −V to maintain the ringer circuit disabled even if DC ringing pulses 124 are received on line 64. Conduction of Q4 also dumps the charge stored on capacitor 87 to maintain Q5 conducting for at least the time interval required to again charge this capacitor 87 in order to provide sufficient time to complete initiation of ring trip in the central office. The collector voltage of Q6 is the output of the power switch 38 in FIG. 2 which is applied to oscillator 45 to produce a 28 kHz carrier signal on line 51. This 28 kHz signal is detected in the central office subscriber carrier terminal where it is employed to complete ring trip by interrupting the central office ringing signal to the subscriber circuit and closing switch 8 in order to turn on oscillator 15.

Initiation of ring trip during a ringing cycle will now be considered. The ringer circuit in FIG. 3 is specifically designed to initiate ring trip during ringing when the relay 70 is energized with arm 73 connected to contact 72. The positive transient is chosen for ring trip to prevent the possibility of the ringer power generator circuit 40 being overloaded if it is turned on by a steady carrier that is coupled to this circuit 40 from another cable pair when the other handset goes off hook. With a DC ringing pulse 124 on line 64, the transistors Q1, Q2 and Q3 are conducting; Q4, Q5 and Q6 are cut off; converter 75 is operational; and relay 70 is energized to connect arm 73 to contact 72. This causes a ringing current to flow from the positive output line 77 of converter 75 through ringer 109, resistor 147, and diodes 145 and 146 to the neutral terminal 78 of the converter. When the handset 106 goes off hook to connect a very low impedance of approximately 100 ohms across terminals 77 and 78 of the converter, a large transient current flows through resistor 147, diode 85, and the capacitor 84 to the ground line 92. A large voltage is developed across capacitor 84 which causes diode 86 to break down to bias Q4 into conduction in order to discharge capacitor 87 therethrough. Capacitor 84 is employed to ensure the presence of the transient voltage for a time interval that is sufficient for Q4 to discharge capacitor 87. Conduction of Q4 through resistor 89 in turn biases Q5 into conduction to essentially clamp the Q1 base electrode to the supply voltage −V in order to cut off Q1. When the transient voltage on capacitor 84 decays, the current through resistor 89 for charging capacitor 87 is sufficient to maintain Q5 conducting for a time interval that is much longer than the duration of a ringing pulse 124 to enable completion of a ring trip cycle. Nonconduction of Q1 opens the charging path of capacitor 120 which then discharges through the resistors 118, 119 and Q3. When the charge on capacitor 120 decays sufficiently to bias Q3 into cutoff, the converter 75 is deenergized to remove the DC ringer voltages from lines 76 and 77. Capacitor 120 continues to discharge to 0 volts through resistor 119 during cutoff of Q3. With Q1 cut off, Q2 is also driven into cutoff to de-energize relay 70 to return the arm 73 thereof to contact 71 as shown in FIG. 3. When the voltage on line 76 and the charge on capacitor 142 decays sufficiently, diode 105 conducts to establish loop current through resistor 122 which biases Q6 into conduction in order to activate the carrier oscillator 45. A 28 kHz signal is transmitted to the central office subscriber carrier terminal to complete initiation of ring trip.

What is claimed is:

1. A ringer power generator circuit for use in a subscriber carrier telephone system comprising a carrier subscriber station terminal that includes a carrier subscriber handset, the system producing pulses of station terminal ringing signal at the carrier subscriber station terminal in response to a central office ringing signal wherein a cycle of the station terminal ringing signal comprises a ringing period including a series of pulses of ringing voltage followed by a silent period during which a constant voltage is present and these ringing pulses are absent and including a two-wire drop associated with the carrier subscriber handset and a VF hybrid circuit of the carrier subscriber station terminal; one drop wire being connected between one of the tip and ring leads of the handset and a first drop side lead on the hybrid circuit; said ringer power generator circuit requiring only a two-wire drop for connection to a handset and comprising:

first means for producing both positive and negative DC ringer voltages on associated output lines thereof, the magnitudes of said ringer voltages being greater than that of the pulses of ringing voltage;

second means which is a control means responsive to the ringing pulses for causing said first means to produce said ringer voltages throughout a ringing period of a ringing cycle;

third means for coupling one of the positive and negative output lines of said first means through the other drop wire to the second drop side lead on the hybrid during the absence of a station terminal ringing signal, said third means decoupling the hybrid from the one output line of said first means during generation of a ringer voltage thereby;

fourth means responsive to operation of said second means for alternately electrically connecting the positive and negative ringer voltage output lines of said first means to the other one of the tip and ring leads of the handset during and between ringing pulses of a ringing period received from the central office for energizing a ringer of the handset; said fourth means continuously electrically connecting the other one of the tip and ring leads of the handset to the one output line of said first means except during a ringing period; and, fifth means which is a ring trip means responsive to a transient signal on the drop wires for sensing an off-hook condition in the handset for initiating ring trip and for de-energizing said first means.

2. The ringer circuit according to claim 1 wherein the subscriber carrier telephone system includes a power source producing first and second voltages, said ringer circuit comprising sixth means connecting third and fourth drop side leads of the hybrid circuit to the first and second voltages, respectively, for providing a loop current path through the hybrid circuit when the handset is off hook.

3. The ringer circuit according to claim 2 wherein said second means comprises:

a first capacitor;

a first resistor;

a first transistor having a base electrode electrically connected through said first resistor and first capacitor to said first voltage; and having emitter and collector electrodes electrically connected between said first voltage and an input line to said first means;

a second transistor being operable in two different operating states, having a base electrode to which the ringing pulses are applied, and having emitter and collector electrodes electrically connected in series between the second voltage and the junction of said first resistor and first capacitor; said second transistor operating in the first state during the absence of a ringing pulse and operating in the second state during receipt of a ringing pulse for charging said first capacitor and for causing said first transistor to conduct to energize said first means; said first capacitor discharging through said first resistor during operation of said second transistor in the first state for maintaining said first transistor conducting and said first means energized between receipt of ringing pulses during a ringing period.

4. The ringer circuit according to claim 3 wherein said fifth means comprises:

a second capacitor and second resistor electrically connected in series between said first and second voltages;

a third transistor having emitter and collector electrodes electrically connected across said second capacitor and having a base electrode;

seventh means sensing an off-hook transient current in the drop wires for forward biasing said third transistor base electrode to cause said third transistor to conduct to discharge said second capacitor and pass a current through said second resistor; and, eighth means responsive to the voltage on said second resistor during conduction of said third transistor for biasing said second transistor to operate in the first state even during receipt of a ringing pulse for enabling initiation of ring trip.

5. The ringer circuit according to claim 4 wherein said first means comprises a third neutral reference voltage output line and wherein said ringer circuit includes a third resistor and first and second back-to-back diodes electrically connected between said neutral line and a point for connection to the one drop wires; and wherein said seventh means comprises a third diode electrically connected between the one side of said third resistor that is spaced from the point of connection to the one drop wire and said third transistor base electrode, said third diode conducting in response to a transient current through said third resistor when the handset goes off hook for biasing said third transistor to conduct.

6. The ringer circuit according to claim 5 wherein said fifth means comprises a third capacitor electrically connected between the one side of said third resistor and the first voltage.

7. The ringer circuit according to claim 6 wherein said third means comprises a fourth diode.

8. The ringer circuit according to claim 7 wherein said fifth means comprises a fifth diode electrically connected between the one side of said third resistor and the junction of said third diode and third capacitor; and wherein said eighth means comprises a fourth transistor responsive to the voltage on said second resistor during conduction of said third transistor and during charging of said second capacitor for effectively connecting the base electrode of said second transistor to the second voltage.

9. The ringer circuit according to claim 8 wherein said first, second, and third diodes are breakdown diodes.

10. The ringer circuit according to claim 7 wherein said second means comprises a fourth resistor electrically connected between said first transistor base electrode and the first voltage.

11. The ringer circuit according to claim 10 wherein said first means comprises a DC-DC converter.

12. The ringer circuit according to claim 7 wherein said fifth means comprises a fifth resistor between the electrical connections of the fourth drop side lead of the hybrid circuit and the second voltage, and a fifth transistor having collector and emitter electrodes electrically connected between the third transistor base electrode and the second voltage, and having a base electrode electrically connected to said fifth resistor for sensing the voltage developed thereacross, said fifth transistor operating in a first one of two states when the handset is on hook and operating in the second state for producing a ring trip signal when loop current flows through said fifth resistor.

13. In a subscriber carrier telephone system, comprising a carrier subscriber station terminal that includes a carrier subscriber handset; producing in the carrier subscriber station terminal DC pulses of station terminal ringing signal in response to a central office ringing signal wherein the station terminal ringing signal alternately comprises a ringing period including a series of pulses of ringing voltage following by a silent period during which a constant voltage is present and these ringing pulses are absent; and including a two-wire drop associated with the carrier subscriber handset and the VF hybrid circuit of the carrier subscriber station terminal, one drop wire being connected between one of the tip and ring leads on the handset and a first drop side lead on the hybrid circuit; the improvement comprising a ringer power generator circuit through which the other wire of the drop is electrically connected between the other one of the tip and ring leads on the handset and a second drop side lead on the hybrid, said ringer circuit comprising:

first means for producing both positive and negative DC ringer voltages on associated output lines thereof, the magnitudes of said ringer voltages being greater than that of the pulses of ringing voltage;

second means which is a control means responsive to the ringing pulses for causing said first means to produce said ringer voltages throughout a ringing period;

third means that is electrically connected between one of the output lines of said first means and the second drop side lead on the hybrid, said third means decoupling the hybrid from the one output line of said first means during generation of a ringer voltage thereby;

fourth means responsive to operation of said second means for alternately electrically connecting the positive and negative ringer voltage output lines of said first means to the other one of the tip and ring leads of the handset during and between ringing pulses of a ringing period that are received from the central office for energizing a ringer of the handset; said fourth means electrically connecting the other one of the tip and ring leads of the handset continuously to the one output line of said first means except during a ringing period; and, fifth means which is a ring trip means responsive to a transient signal on the drop wires for sensing an off-hook condition in the handset for initiating ring trip and for de-energizing said first means.

14. The ringer circuit according to claim 13 wherein said third means comprises a first diode.

15. The ringer circuit according to claim 14 wherein the telephone system includes a power source producing first and second DC voltages and third and fourth drop side leads of the hybrid circuit that are electrically connected to the first and second voltages, respectively, for providing a loop current path through the hybrid circuit when the handset is off hook; and including sixth means electrically connecting said first means to the power source.

16. The ringer circuit according to claim 15 wherein said second means comprises:

a first capacitor;

a first resistor;

a first transistor having a base electrode electrically connected through said first resistor and first capacitor to said first voltage; and having emitter and collector electrodes electrically connected between said first voltage and an input line to said first means;

a second transistor being operable in two different operating states, having a base electrode to which the ringing pulses are applied, and having emitter and collector electrodes electrically connected in series between the second voltage and the junction of said first resistor and first capacitor; said second transistor operating in the first state during the absence of a ringing pulse and operating in the second state during receipt of a ringing pulse for charging said first capacitor and for causing said first transistor to conduct to energize said first means; said first capacitor discharging through said first resistor during operation of said second transistor in the first state for maintaining said first transistor conducting and said first means energized between receipt of ringing pulses during a ringing period.

17. The ringer circuit according to claim 16 wherein said second means comprises a second resistor electrically connected between said first transistor base electrode and the first voltage.

18. The ringer circuit according to claim 17 wherein said fifth means comprises:

a second capacitor and third resistor electrically connected in series between the first and second voltages;

a third transistor having emitter and collector electrodes electrically connected across said second capacitor and having a base electrode;

seventh means sensing an off-hook transient current in the drop wires for forward biasing said third transistor base electrode to cause said third transistor to conduct to discharge said second capacitor and pass a current through said third resistor; and, eighth means responsive to the voltage on said third resistor during conduction of said third transistor for biasing said second transistor to operate in the first state even during receipt of a ringing pulse for enabling ring trip operation.

19. The ringer circuit according to claim 18 wherein said first means comprises a third neutral reference voltage output line, and a fourth resistor and second and third back-to-back diodes connected between the one drop wire and said neutral line; and wherein said seventh means comprises a fourth diode electrically connected between the one side of said fourth resistor spaced from the one drop wire and said third transistor base electrode, and a third capacitor electrically connected between the one side of said fourth resistor and the first voltage, said fourth diode conducting in response to a transient current through said fourth resistor when the handset goes off hook for biasing said third transistor to conduct.

20. The ringer circuit according to claim 19 wherein said seventh means comprises a fifth diode electrically connected between the one side of said fourth resistor and the junction of said fourth diode and third capacitor; and wherein said eighth means comprises a fourth transistor responsive to the voltage on said third resistor during conduction of said third transistor and during charging of said second capacitor for effectively connecting the base electrode of said second transistor to the second voltage.

21. The ringer circuit according to claim 19 wherein said fifth means comprises a fifth resistor between the electrical connection of the fourth drop side lead of the hybrid circuit to the second voltage, and a fifth transistor having collector and emitter electrodes electrically connected between the third transistor base electrode and the second voltage, and having a base electrode electrically connected to said fifth resistor for sensing the voltage developed thereacross, said fifth transistor operating in a first one of two states when the handset is on hook and operating in the second state for producing a ring trip signal when loop current flows through said fifth resistor.

22. A ringer-power generator circuit for use in a subscriber carrier telephone system comprising a carrier subscriber station terminal that includes a carrier subscriber handset, the system producing pulses of station terminal ringing signal at the carrier subscriber station terminal in response to a central office ringing signal wherein a cycle of the station terminal ringing signal alternately comprises a ringing period including a series of pulses of ringing voltage followed by a silent period during which a constant voltage is present and these ringing pulses are absent, and including a two-wire drop associated with the carrier subscriber handset and a voice-frequency hybrid circuit of the carrier subscriber station terminal; one drop wire being connected between one of the tip and ring leads of the handset and a first drop side lead of the hybrid circuit; said ringer-power generator circuit comprising:

- a source of first and second reference voltage potentials for connection to second and third drop side leads of the hybrid circuits;
- first means responsive to voltage from said first source and producing both positive and negative DC ringer voltages, with respect to a neutral reference voltage output line thereof on associated output lines thereof, the magnitudes of the ringer voltages being greater than that of the pulses of ringing voltage;
- second means for connecting the neutral line of said first means to the one drop wire; said second means including a first resistor;
- third means which is a control means responsive to ringing pulses for causing said first means to produce said ringer voltages during a ringing period;
- a first diode having one side electrically connected to one of the output lines of said first means and having the other side electrically connected through the other drop wire to a fourth drop side lead on the hybrid circuit for decoupling the hybrid circuit from the one output line of said first means during generation of a ringer voltage thereby;
- fourth means responsive to the operation of said third means for connecting the other one of the tip and ring leads of the handset alternately to the positive and negative ringer-voltage output lines of said first means throughout a ringing period of a ringing cycle for energizing a ringer of the handset; said fourth means continuously connecting the one output line of said first means to the other one of the tip and ring leads of the handset throughout the silent period of a ringing cycle; and
- fifth means which is a ring trip means responsive to an off-hook transient signal produced by the handset and sensed by said first resistor of said second means for initiating ring trip and for de-energizing said first means.

23. The ringer circuit according to claim 22 wherein said fifth means comprises:

- a first capacitor and second resistor electrically connected in series between said first and second voltages;
- a first transistor having emitter and collector electrodes connected across said first capacitor and having a base electrode;
- sixth means coupling the transient signal sensed by said first resistor to the base electrode of said first transistor for causing the latter to conduct to discharge said first capacitor; and
- seventh means responsive to the voltage on said second resistor during conduction of said first transistor for causing said third means to prevent said first means producing ringer voltages even during receipt of ringing pulses for initiating ring trip.

24. The ringer circuit according to claim 23 wherein said sixth means comprises: a second diode, which is a Zener diode, and a second capacitor electrically connected in series between said first transistor base electrode and the first potential, and a third diode electrically connected between the junction of said second diode and second capacitor and the one side of said first resistor that is spaced from the one drop wire.

25. The ringer circuit according to claim 24 wherein said fifth means comprises: a third resistor in the electrical connections of said third drop side lead of the hybrid circuit and the second voltage, and a second transistor having collector and emitter electrodes electrically connected between the first transistor base electrode and the second voltage, and having a base electrode electrically connected to said third resistor for sensing the voltage developed thereacross, said second transistor operating in a first one of two states when the handset is on-hook and operating in the second state for producing a ring-trip signal when loop current flows through the hybrid and said third resistor.

26. The ringer circuit according to claim 25 wherein said third means comprises:

- a third capacitor;
- a fourth resistor;
- a third transistor having a base electrode electrically connected in series through said fourth resistor and third capacitor to the first voltage; and having emitter and collector electrodes electrically connected between said first voltage and an input line to said first means for controlling energization of said first means.

27. The ringer circuit according to claim 26 wherein said third means comprises a fourth transistor being operable in two different operating states, having a base electrode to which the ringer pulses are applied, and having emitter and collector electrodes electrically connected in series between the second voltage and the junction of said fourth resistor and said third capacitor; and fourth transistor operating in the first state during the absence of a ringing pulse and operating in the second state during receipt of a ringing pulse for charging said third capacitor and for causing said third transistor to conduct to energize said first means; said third capacitor discharging through said fourth resistor and the third transistor base-emitter junction diode during operation of said fourth transistor in the first state for maintaining said third transistor conducting and said first means energized between receipt of ringing pulses during a ringing period.

28. The ringer circuit according to claim 27 wherein said third means comprises a fifth resistor electrically connected between said third transistor base electrode and the first voltage.

29. The ringer circuit according to claim 28 wherein said second means comprises fourth and fifth diodes which are Zener diodes electrically connected back-to-back and in series with said first resistor between the neutral line of said first means and the one drop wire.

30. The ringer circuit according to claim 29 wherein said seventh means comprises a fifth transistor responsive to a voltage on said second resistor during conduction of said first transistor therethrough and during charging of said first capacitor therethrough for effectively connecting the base electrode of said fourth transistor to the second voltage.

* * * * *

UNITED STATES PATENT AND TRADEMARK OFFICE

CERTIFICATE OF CORRECTION

PATENT NO. : 3,927,266

DATED : December 16, 1975

INVENTOR(S) : James A. Stewart & Neale A. Zellmer

It is certified that error appears in the above-identified patent and that said Letters Patent are hereby corrected as shown below:

Column 4, line 40, after "96", a period should be inserted.

Column 5, line 37, after "comprise", the word -- an -- should be included.

Column 6, line 19, after "example", the word -- be -- should be included.

Claim 13, line 32, after "voltage", the word "following" should read -- followed --.

Signed and Sealed this

*fourth* Day of *May 1976*

[SEAL]

*Attest:*

RUTH C. MASON
*Attesting Officer*

C. MARSHALL DANN
*Commissioner of Patents and Trademarks*